April 2, 1963 G. M. BERKIN 3,083,910

SERIAL ADDER AND SUBTRACTER

Filed Oct. 14, 1959 5 Sheets-Sheet 1

April 2, 1963 G. M. BERKIN 3,083,910

SERIAL ADDER AND SUBTRACTER

Filed Oct. 14, 1959 5 Sheets-Sheet 2

April 2, 1963 G. M. BERKIN 3,083,910

SERIAL ADDER AND SUBTRACTER

Filed Oct. 14, 1959

5 Sheets-Sheet 3

April 2, 1963 G. M. BERKIN 3,083,910

SERIAL ADDER AND SUBTRACTER

Filed Oct. 14, 1959 5 Sheets-Sheet 5

United States Patent Office 3,083,910

Patented Apr. 2, 1963

3,083,910

SERIAL ADDER AND SUBTRACTER

George M. Berkin, Poughkeepsie, N.Y., assignor to International Business Machines Corporation, New York, N.Y., a corporation of New York Filed Oct. 14, 1959, Ser. No. 846,279
33 Claims. (Cl. 235—153)

This invention relates to systems of the digital type for the addition and subtraction of numbers and has for an object the provision of a relatively simple and reliable system to which there are applied streams of pulses presenting the numerical input information in a binary-coded-decimal form and including a parity bit.

A further object of the invention is to provide an electronic system for performing arithmetic operations in which the pulse repetition frequency is limited only by the speed of operation of the component parts.

It is a further object of the invention to produce an output series of pulses, on a single line, which represent the sum or difference of the decimal input information and without limit as to the size of the input and output words.

Yet another object of the invention is to provide an electronic arithmetic system which will function as an adder or a subtracter as determined by the energization or deenergization of a single control circuit in the system.

A further object of the invention is to provide error-indicating parity bits by means of a parity bit counter and a parity bit generator.

Yet another object of the invention is to utilize the 1, 2, 4, 8 code in a manner compatible with the Hollerith system together with a binary-to-decimal-six correction.

The advantages of the 1, 2, 4, 8 code are well known. This code permits, to substantial degree, the use of simple binary addition methods. Accordingly, many systems have been proposed utilizing the aforesaid code and provisions have been made to solve the problem of the decimal carry which arises in conjunction with that code. More particularly, if there should appear bits in a 1 state in the 8-bits of two words to be added, it will be seen that the sum will be in a 0 state and the carry in a 1 state. In this instance the carry is equal to 16 instead of 10, the latter being the carry necessary for use in the decimal systems. If 10 be subtracted from 16, the desired answer of 6 and a carry of 10 will be achieved. This result may also be accomplished by the addition of six to one of the numbers and by the subtraction of 16. Arrangements for producing the aforesaid operations have been heretofore proposed, but they are of a complex nature and they require a relatively large number of parts.

It is a further object of the present invention to provide a single reliable system for applying the binary-to-decimal-six correction during both addition and subtraction and to apply that correction each time it is required.

In carrying out the present invention in one form thereof, two streams of pulses are applied as inputs of numerical information in a binary-coded-decimal together with corresponding parity bits. These two streams of pulses are applied to an arithmetic system which will add together, or subtract one from the other, the numerical information applied serially by means of the two streams of pulses. The arithmetic system has three inputs, one being a carry or borrow input and two outputs, one for the sum or difference and the other for the carry or borrow. The sum-output from the arithmetic system is applied to a 4-cycle delay. Since each binary-coded-decimal digit is to be represented by four bits, it will be seen that the sum of each decimal digit will be stored in the 4-cycle delay; and arrangements are made for the resubmission of that sum to the arithmetic system. Provision is made for detection of the need for and the production of a carry and for the application of the binary-to-decimal-six correction. The carry or borrow-output is applied to a one-cycle delay which, at the proper time, produces an input to the arithmetic system and which input is also applied to a parity bit counter which in conjunction with a parity bit generator provides a parity or redundancy bit output for use in detecting errors in the operation of the system as a whole.

For further objects and advantages of the invention and for a more detailed discussion of its component parts and the manner of operation, reference is to be had to the following description taken in conjunction with the accompanying drawings in which:

FIG. 1 is a block diagram schematically illustrating the invention;

FIG. 2 is a fractional part of a chart illustrating a typical problem of addition performed on the system of FIG. 1;

FIG. 3 illustrates the manner in which

Figures 1, 2, 3, 4, 5, 6:
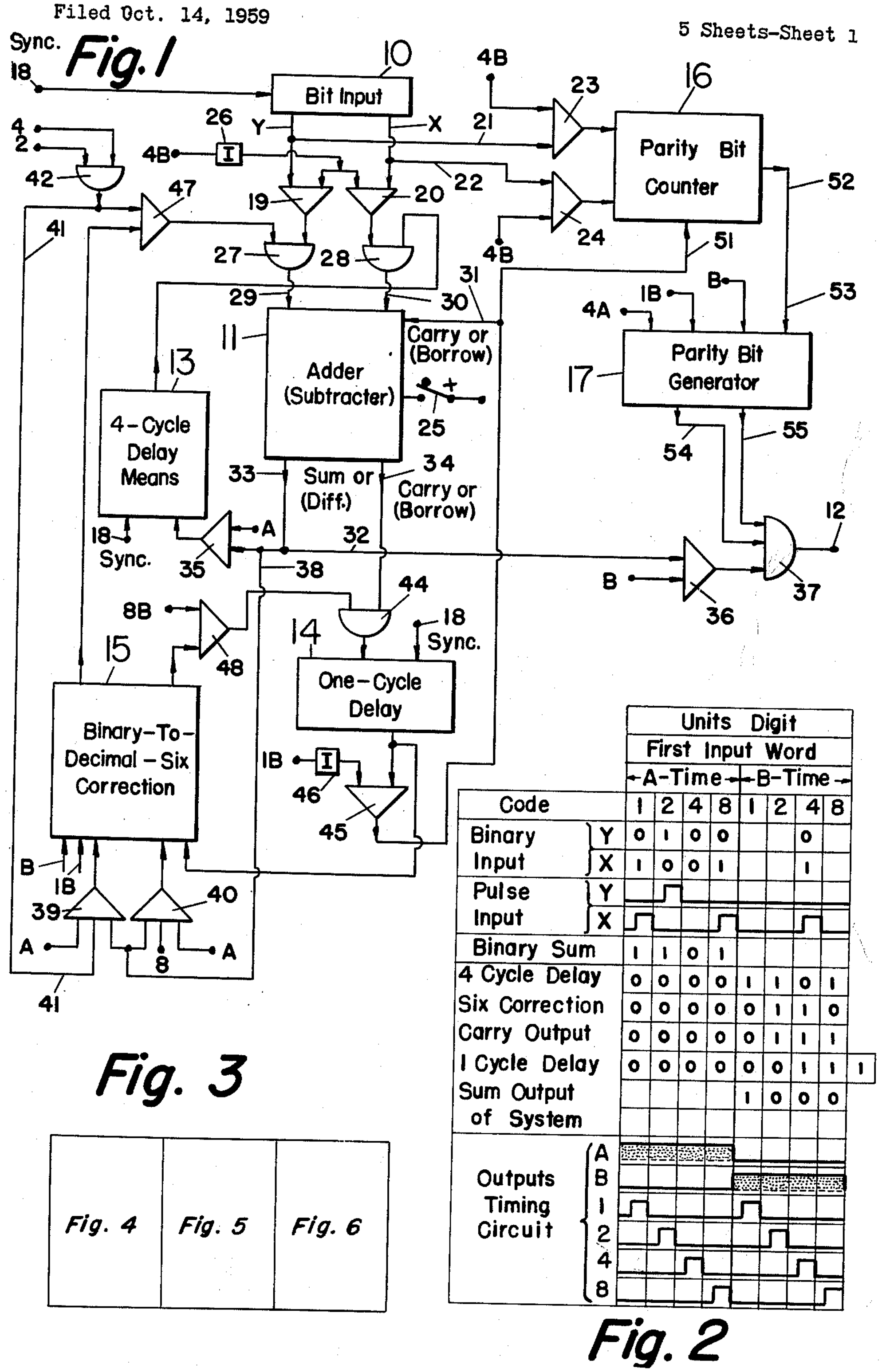
Figure 4:
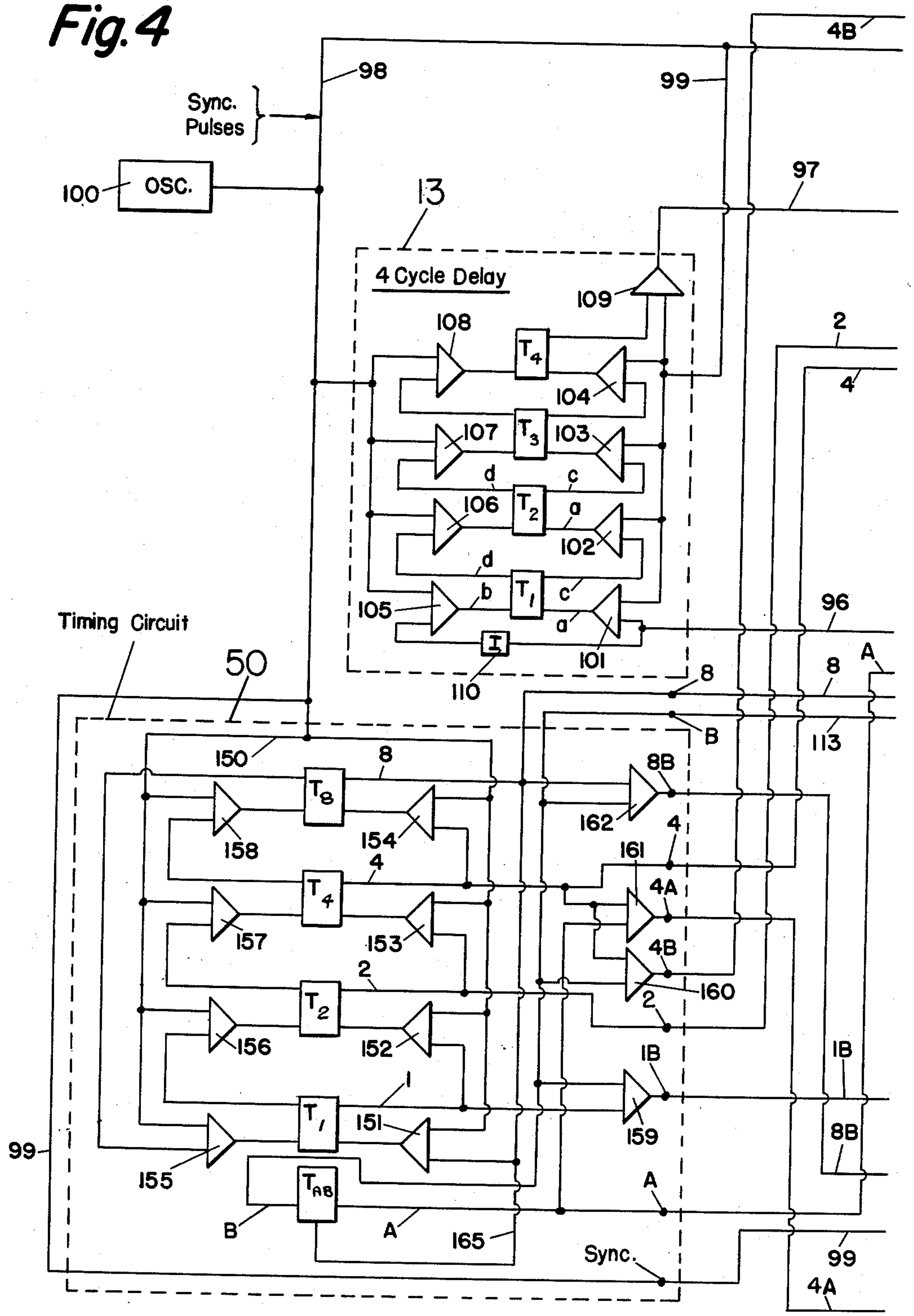
FIGS. 4, 5 and 6 are to be assembled to form the system of FIG. 1 by a line diagram diagrammatically illustrating the components of each of the systems appearing in block-form in FIG. 1.
Figure 5:
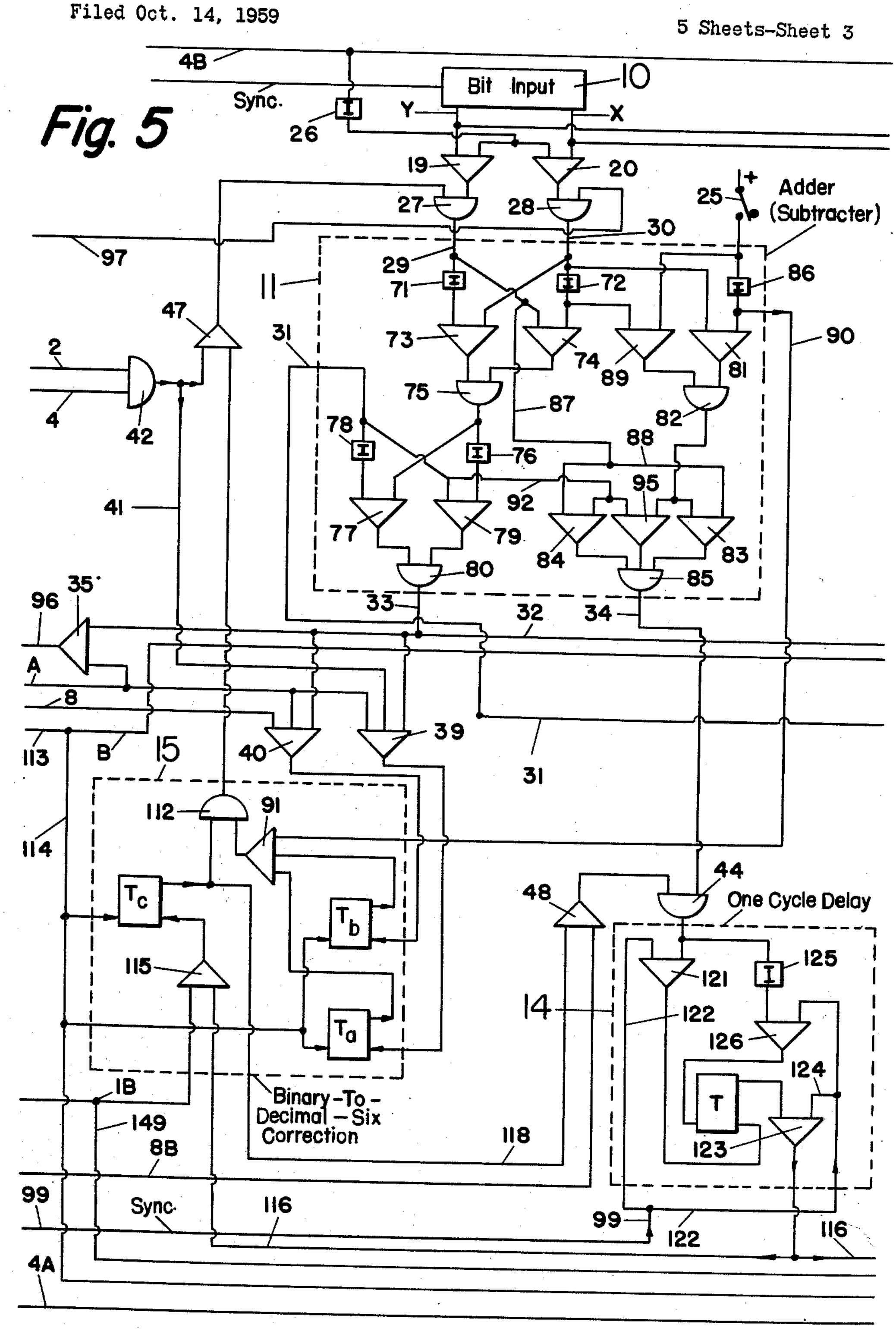
Figure 6:
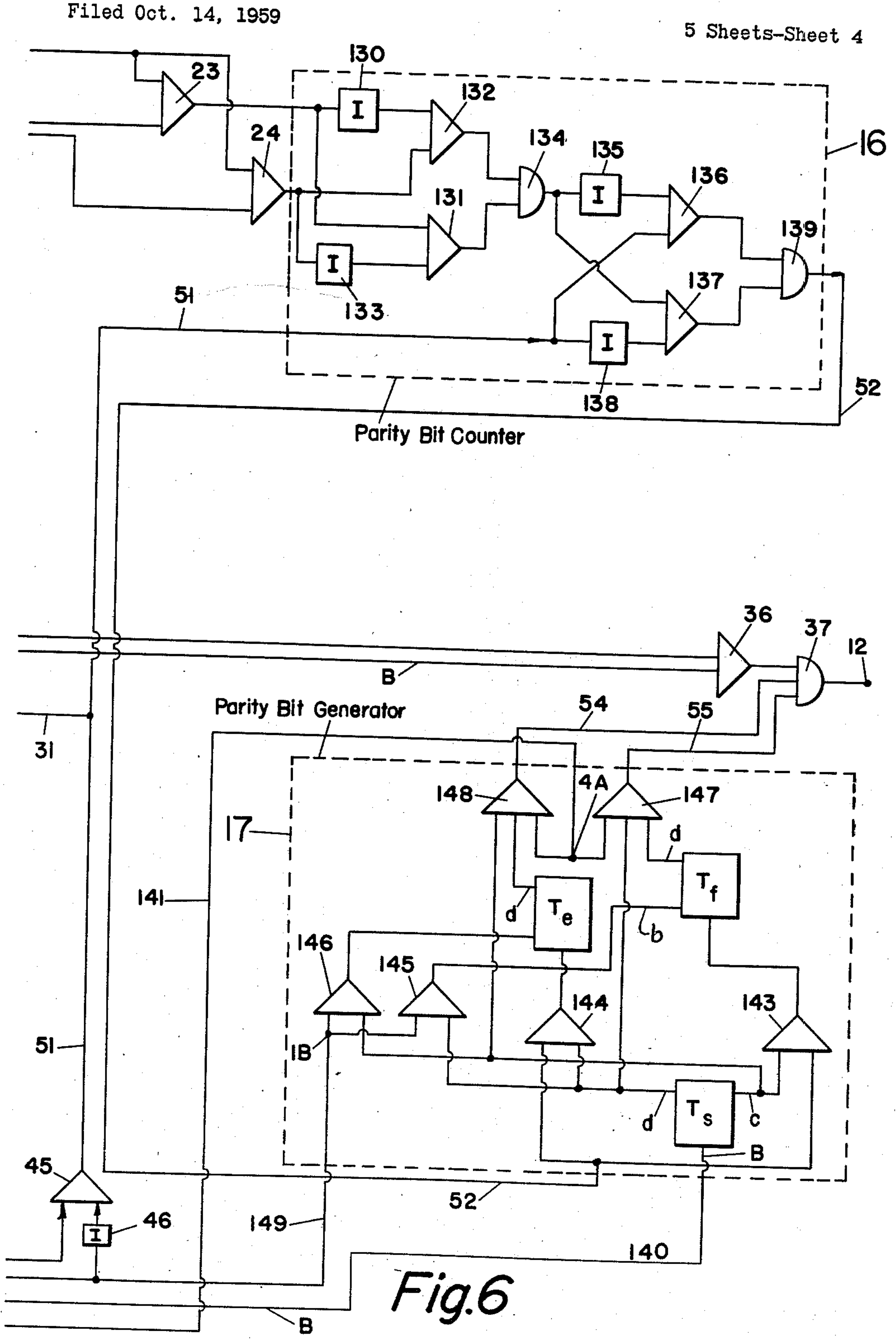
Figure 7:
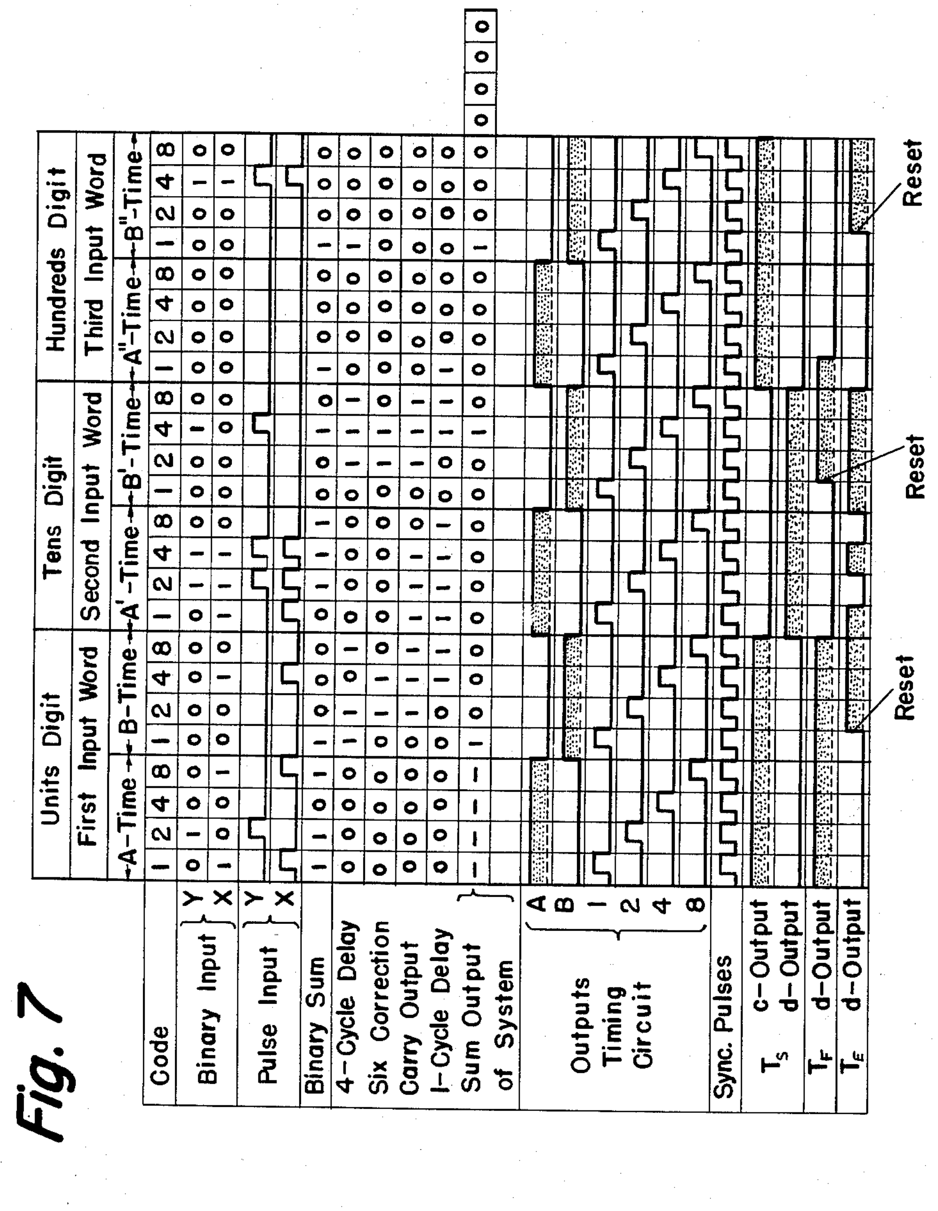

FIGS. 4, 5 and 6 together illustrate schematically and in detail the system of FIG. 1; and FIG. 7 is a complete chart illustrating the typical problem of addition performed on the system of FIG. 1, which system is shown more in detail in FIGS. 4, 5 and 6.

Referring to FIG. 1, the invention in one form has been shown by means of a block diagram. The principal components of the system include a "Bit Input" system or read-register 10 of a type well understood by those skilled in the art. The input to the arithmetic system of the present invention comes from the bit-input device 10 by way of conductors or inputs Y and X. These lead to AND-circuits 19 and 20 and thence through OR-circuits 27 and 28 to an adder-subtracter 11. The adder-subtracter 11, besides inputs 29 and 30, has a carry or borrow input 31; and it has a control switch 25. The control switch 25 serves to control the energization and deenergization of a control circuit for converting the adder to a subtracter. When the switch 25 is in an open position, the control circuit is deenergized and the adder-subtracter 11 functions as an adder.

The adder-subtracter 11 has a sum-output 33 and a carry-output 34. When used as a subtracter, the sum-output becomes a difference-output 33 and the carry-output 34 becomes a borrow-output 34. The output 33 is applied through an AND-circuit 35 to a 4-cycle delay 13.

After four cycles of operation, the output from the delay means 13 is applied to the OR-circuit 28 and the sum is then serially fed to the adder 11.

The output at 33 is also applied to an AND-circuit 36 which at the proper time applies the system-output to an OR-circuit 37 and thence to the final system-output terminal 12.

The output 33 is likewise applied to a pair of AND-circuits 39 and 40 forming two of the inputs to the binary-to-decimal-six-correction system 15. This system has an add or subtract control line and three additional inputs, one designated B, one designated 1B and the third input coming from the one-cycle delay 14. This one-cycle delay receives an input from the output 34 through the OR-circuit 44.

Inputs Y and X are through AND-circuts 23 and 24 arranged to pass signals at the proper time to a parity bit counter 16. This counter 16 also has an input 51 from the AND-circuit 45 and has an output 52 which forms the input 53 to the parity bit generator 17. This parity bit generator is arranged through its outputs 54 and 55 to supply to the OR-circuit 37 parity bits or redundancy bits (the two terms are deemed the same) for the detection of error should it arise during the operation of the system as a whole, or should there be an error in one of the input information lines.

With the above identification of the principal components of the system of FIG. 1, there will now be given more detailed attention to the several parts and to the manner in which they cooperate together.

Returning to the read-register or bit-input system 10, it will be observed that it has an input supplied from a terminal 18 representative of a source of synchronizing pulses (shown on the drawing in the abbreviated form of "Sync."). Under the control of the synchronizing pulses, the bit-input system 10 applies to the inputs Y and X streams of pulses. These streams of pulses comprise a series of bits. Predetermined groups of bits form words. The system of the present invention is entirely compatible with systems utilizing the Hollerith code; that is to say, Hollerith codes and other arrangements of supplying the numerical information and the parity bit information to the inputs Y and X as from the bit-input system 10. The particular arrangement utilized can best be understood by now referring to FIG. 2 which is a fractional part of a larger table appearing herein as FIG. 7.

In FIG. 2, it will be seen that the first input word representing the units decimal digit may be divided into two parts. The part which appears during A-time is made up of 4 bits representing the 1, 2, 4, 8 code. This part of the word which appears during A-time will be referred to as the number part of the word. For convenience, during B-time there have been shown the numbers 1, 2, 4 and 8. Thus, though the second part of the word, referred to as the parity-part, actually makes use of but one of the bit positions, that appearing at 4B-time, the corresponding code numbers have been utilized as a convenience in referring to what happens, as at 1B-time, 2B-time, 4B-time and 8B-time. Similarly reference will be made to the code numbers to identify 1A, 2A, 4A and 8A-times. The bits of the 1, 2, 4, 8 code will also be referred to as a 1-bit, 2-bit, 4-bit and 8-bit or as a one-position, two-position, four-position and eight-position.

It will now be assumed that the first synchronizing pulse has been applied by way of terminal 18 to the bit-input system 10 and that the first input word as shown in FIG. 2 is to be applied to the adder 11. The 1-bits of the 1, 2, 4, 8 code are then applied. At the Y-input, there is applied a bit in a 0 state, and at the X-input there is applied a bit in a 1 state. These bits, corresponding with those used in the binary system, appear as electrical pulses. Thus, as shown in FIG. 2, at the lines labeled Pulse Input, it will be observed that at the X-input there is a positive pulse, whereas there is lacking any pulse at the Y-input. In practice, a "0" may be represented either by the absence of a pulse or by a negative-going pulse, whereas a 1 will in the present system always be represented by a positive pulse. In this connection it is to be noted that bits in a 1 state can be represented by negative pulses and bits in a 0 state by positive pulses. However, for convenience the notation of a positive pulse for a "1" and the absence of a pulse for a "0" will be utilized throughout the following description and claims. In addition, it will be convenient to refer to an input or to an output as "up" when there is present at either a positive pulse representing a 1 and to refer to such inputs and outputs as "down" when there is an absence of a positive pulse representative of a 0. The foregoing will also be expressed by reference to 1-inputs, 1-outputs, 0-inputs and 0-outputs.

Since the "0" at Y and the "1" at X occur concurrently and as a result of the first of the synchronizing pulses from terminal 18, they can be described as appearing at 1A-time. In accordance with the binary method, it is also known that the addition of a "0" and a "1" produces a "1" in the binary sum, and this result is shown in the "Binary Sum" line of FIG. 2.

The bits appearing at 1A-time are applied to the AND-circuits 19 and 20. Each AND-circuit has two inputs. One input of each AND-circuit comes from an inverter 26 connected to a terminal which is to have applied thereto at 4B-time an up-input. Since during all of A-time and during all of B-time, except 4B-time there is lacking an up-input to the inverter 26, it will be understood that the output from the inverter 26 will always be up except at 4B-time. Accordingly, the AND-circuits 19 and 20 are conditioned to be conductive and to transmit therethrough the applied pulses from the bit-input system 10.

Since at 1A-time the input to the AND-circuit 19 is down, no pulse will be transmitted therethrough to an OR-circuit 27 and thence to the input circuit 29 of the arithmetic system 11 which, until closure of switch 25, will hereinafter be referred to as adder 11.

The up-input at X transmits through AND-circuit 20 a pulse which applies an up-input to the OR-circuit 28 and thence to the other input-circuit 30 of the adder 11.

The adder 11 produces at the sum-output 33 the aforementioned sum represented by a 1. Thus, the sum-output 33 is up and applies to an AND-circuit 35 an up-input. The other input to the AND-circuit 35 is derived from a terminal A. This indicates that at that terminal A the output is up during A-time. Accordingly, the bit in a 1 state is transmitted through the AND-circuit 35 to a 4-cycle delay means 13. This delay means or system receives the "1" and in the same way receives the subsequent three bits from sum-output 33, thus providing for a 4-cycle delay. The delay means 13 operates under the control of the synchronizing pulses applied thereto as at input terminal 18. It may here be observed that at the termination of the fourth synchronizing pulse, there will be produced at the output from the delay means 13 the first-applied bit, namely, the bit in a 1 state. The corresponding up-output from delay means 13 is applied to the OR-circuit 28 for resubmission of the 1 bit of the sum to the adder 11.

Since several references have already been made to the several timing inputs to some of the AND-circuits, attention is directed to the several outputs from the timing circuit (shown in FIG. 4 in detail). Thus, a terminal designated A shows that at the same time as the appearance of the first input word, there is an up-output at A which lasts substantially throughout A-time. The foregoing is illustrated in FIG. 2. During B-time, the A-output is down and the B-output is up. Similarly, it will be seen that there are provided at the "Timing Circuit" of FIG. 4 up-outputs at 1A-time, 2A-time, 4A-time and 8A-time. Hence, there are up-outputs at 1B-time, 2B-time, 4B-time and 8B-time, at correspondingly numbered terminals. Accordingly, when reference is made to the several input terminals, the outputs from the timing circuit will be provided as shown in FIG. 2. It is also to be understood that A and B-times appear during the first input word, A′ and B′-times appear during the second input word, and that A″ and B″-times appear during the third input word as shown in FIG. 7. Accordingly, when reference is made to the several input terminals during the second and subsequent input words, the outputs from the timing circuit 50 will be provided at the same relative positions as those provided during A and B-times. For example, the output 4B provides an up-output at 4B, 4B′ and 4B″-times.

Returning again to the adder 11, the up-output at 33 besides its application to the AND-circuit 35 is applied by conductor 32 to an AND-circuit 36 forming one of the inputs to OR-circuit 37. Since the other input to AND-circuit 36 is down during A-time and is up only during B-time, the up-output at 33 is not transmitted through the AND-circuit 36.

The up-output at 33 is also applied by way of conductor 38 to a pair of AND-circuits 39 and 40. That output is not transmitted by the AND-circuit 39 because it is not yet 8-time though it is A-time. The sum-output is not transmitted by way of AND-circuit 40 for the reason that one of the inputs is supplied from an OR-circuit 42 which has an up-input at 2-time and at 4-time. Since the operation being described has occurred at 1A-time, there is not transmitted to the binary-to-decimal-six correction system 15 an input from either of the AND-circuits 39 and 40. The six-correction system 15 has other inputs which are up at 1B-time, B-time and a fifth input which receives the output from the one-cycle delay 14. The one-cycle delay 14 may receive an input through the OR-circuit 44 either from the carry circuit 34 or from the six-correction system 15 by way of an AND-circuit 48. However, for the condition being described, i.e., 1A-time, there is no input to the one-cycle delay 14.

Mention has already been made of the fact that the present system provides for a parity check, that is to say, whether or not any error occurs in the transmission of digits, as for example by transmitting a digit twice. More particularly, in order to keep track of the number of "1's" and whether the number is odd or even, requires the use of a parity bit counter shown at 16. Information from the bit-input system 10 is only transmitted to the counter 16 at 4B-time. Thus, while conductors 21 and 22 are connected to the Y and X inputs, no information is transmitted through AND-circuits 23 and 24 until their 4B-inputs are up.

Assuming that the second synchronizing pulse has been applied at 18 to the bit-input system 10, it will be understood that it is now 2A-time; and pursuant to FIG. 1, the Y-input will be up to provide a 1-output, while the X-input will be down to provide a 0-output.

The termination of the second synchronizing pulse, also applied to the 4-cycle delay means 13, causes it to move the first sum from its first to its second stage. During the time of the second synchronizing pulse, the up-output at 33, representative of a "1," will also be entered into delay means 13.

Other operations will be the same as described for the bits applied at 1A-time with the exception that it will be noted that the OR-circuit 42 has applied thereto an up-input from its 2-terminal which is transmitted by way of conductor 41 to the AND-circuit 39. As a result, there is applied to the six-correction system 15 an up-input. This system 15, however, does not as yet produce an output for the reason that it has not yet been determined whether or not there is to be a six-correction.

With the appearance of the next synchronizing pulse, it will be seen that the X and Y inputs to the adder 11 will both be down since at 4A-time the bits at Y and X are both 0. Accordingly, only two operations need be mentioned. First, the termination of the third synchronizing pulse applied to the delay means 13 cycles the delay means 13 to move forward the previously stored bits. Second, at 4A-time there will be an up-input from terminal 4 for the OR-circuit 42. The resultant pulse will not be transmitted through the AND-circuit 39 since the output 33 from the adder 11 is down. Thus, it will be seen that since the sum-output 33 is down at 4A-time, there will not be an up-input to the six-correction system 15 from AND-circuit 40.

At 8A-time, for the fourth synchronizing pulse, the Y-input will be down and the X-input up for application to the adder 11 of an up-input by way of AND-circuit 20 and OR-circuit 28. The sum-output 33 will be up and the carry-output 34 will be down.

It is to be noted that during the whole of A-time, there was not produced a carry output. Accordingly, there remained at 34 a down-output.

Referring to AND-circuit 40, all three inputs are up since it is 8A-time and the sum-output 33 is up. The AND-circuit 40 transmits to the six-correction system 15 an up-input. This system 15 is thereby conditioned for the application at the proper time of the binary-to-decimal-six-correction factor.

As before, the up-output at 33 is transmitted through the AND-circuit 35 to the delay means 13. This delay means has now received input information corresponding with the binary sum "1101" as shown in FIG. 2.

During B-time inputs X and Y are down except for 4B-time. During 4B-time, the input to the inverter 26 is up and hence its output is down. As a result, there may not be transmitted pulses through the AND-circuits 19 and 20. When present, there will appear at inputs Y and X at 4B-time the parity bits which at that time will be transmitted through AND-circuits 23 and 24 since these AND-circuits will at 4B-time have up-inputs from terminals 4B to condition them for transmission of any parity bits present at either input.

During B-time, the successive synchronizing pulses applied to the delay means 13 produce, serially by bits at the output thereof, the binary sum 1101 which had been stored. Thus, during B-time, there is resubmitted to the adder 11 by way of the OR-circuit 28 the binary sum.

More particularly, at 1B-time the output 33 will be up, and there will be applied to the AND-circuit 36 an up-input which is transmitted by the AND-circuit 36 since its other input is up during the whole of B-time. The AND-circuit 36 thus applies to the OR-circuit 37 an up-input which appears in the final output 12 of the system as an up-output representative of a 1. This 1 is shown in the system-output line of FIG. 2 at 1B-time.

At 2B-time, there will be applied to the adder 11 an up-input through the OR-circuit 28 to input line 30. There will also be applied an up-input through the OR-circuit 27 to the input line 29 since at 2-time (including 2B-time) there is applied to the OR-circuit 42 an up-input which in turn is applied to the AND-circuit 47. Because of previous conditioning, at 2B-time, the six-correction system 15 applies an up-input to the AND-circuit 47, accordingly there appears an up-input at line 29. Thus, with both inputs 29 and 30 up, the sum-output at 33 will be down, but the carry-output 34 will be up. The up-output at 34 is applied to the OR-circuit 44 and thence to the one-cycle delay circuit 14. Since output 33 is down, there appears a "0" at system-output 12, at 2B-time.

At 4B-time, the output from the 4-cycle delay means 13 is down, and hence the input at line 30 will be down. However, there is applied to the OR-circuit 42 from input terminal 4 an up-output which is applied to the AND-circuit 47. The six-correction system 15 at 4B-time also applies an input to the AND-circuit which is transmitted thereby to the OR-circuit 27 and thence to the input 29 of the adder 11.

At 4B-time, the input to the adder 11 from the delay means 13 will be down. Due to the entry into delay means 14 of an up-input during the preceding cycle, 2B-time, there will now be applied by way of AND-circuit 45 to input 31 the delayed carry. Thus, with the two up-inputs to the adder 11, the sum-output 33 will be down; but the carry-output 34 will again be up to apply an up-output to the one-cyle delay 14. With the output 33 down, there will appear a "0" at the system-output 12 at 4B-time.

At 8B-time, the output from the delay means 13 will be up and so will be output from the one-cycle delay 14. Thus, with two up-inputs to the adder 11, the output at output 33 will be down and the carry-output 34 will be up. There appears a "0" at the system-output terminal 12, at 8B-time.

Inasmuch as there appeared at 8B-time a carry output which was applied to the one-cycle delay means 14, it will, of course, be understood that there will be an output from the delay means 14 at 1A'-time. Such an output as shown in FIG. 2 produces an up-input to the adder 11 at 1A'-time, the other inputs, of course, being by way of lines X and Y from the bit-input system 10.

With the above understanding of the block diagram of FIG. 1, it will be seen that the input words are applied serially to inputs X and Y and that the output words appear at the output terminal 12 in serial fashion. It will be understood from the above that the number part of the input words appear during A-time, while the number part of the output words appear during B-time. Similarly, the input parity bits appear at 4B-time and the output parity bits at 4A'-time. Because of the application of the information serially to inputs X and Y and the corresponding manner of producing the system output, it will be understood that a succession of words may be applied to represent numbers without limit as to size. In the subsequent description of the more complete system, the operations will be carried through the hundreds digit, it being understood that the operations will be the same regardless of how large the numbers may be which it is desired to add or to subtract.

Referring now to the complete system of FIGS. 4, 5 and 6, these figures being arranged as illustrated in FIG. 3, there will first be described the manner in which each of the principal components of the system functions with particular reference as to how the above-described operations are carried out. There will then follow a review of the operation of the system for subtraction and further reference will be made, not only to the first input word, but also to the second and third input words as illustrated in the complete chart of FIG. 7.

*The Adder 11*

With the control switch 25 in its illustrated open position, FIG. 5, the adder-subtractor 11 operates in a manner quite similar to the full-adder described by R. K. Richards in his book, "Arithmetic Operations in Digital Computers" (1955) at pages 81–92. In that part of my system shown in FIG. 5, it will be noted that the inputs 29 and 30 are cross-connected to AND-circuits 73 and 74. There are also connections to these AND-circuits through inverters 71 and 72 respectively. The AND-circuits 73 and 74 form the inputs to an OR-circuit 75. The output of OR-circuit 75 is directly connected to an AND-circuit 77 and through an inverter 76 to an AND-circuit 79. The other input to the AND-circuit 77 is by way of inverter 78 to the carry-input line 31. The other input to the AND-circuit 79 is directly from the carry-input line 31. The AND-circuits 77 and 79 form the inputs to the OR-circuit 80. The interconnected components 71—75 and the interconnected components 76—80 each forms a separate half-adder of the type illustrated in the above-named book at page 86. It will be noted there is a direct connection from input 29 by way of conductors 87 and 88 to AND-circuits 83 and 84. These AND-circuits 83 and 84 form inputs to an OR-circuit 85 from whence the carry-output 34 is derived. The AND-circuit 83 has a second input obtained from an OR-circuit 82 which in turn has two inputs. The first input is by way of AND-circuit 81 to the input connection 30. This AND-circuit 81 during addition is normally conditioned to transmit pulses from input 30 by reason of the inclusion of the inverter 86 in the circuit leading to the control switch 25. Thus, with this switch open, the output from the inverter 86 is up, conditioning the AND-circuit 81 to conduct. The AND-circuit 89, forming the other input to OR-circuit 82, is conditioned not to conduct during addition since one of its inputs comes from the input side of the inverter 86.

Assuming now there are concurrently applied to input 29 and 30 the bits appearing at 1A-time, it will be seen at once that the input at 29 will be down and that the input at 30 will be up. Accordingly, by action of the inverter 71 and the cross-connection from input line 30, the AND-circuit 73 will have an up-output applied to the OR-circuit 75. The output of the OR-circuit 75 is the sum of the bits applied to the inputs 29 and 30 and is termed an initial sum. The output of the OR-circuit 75 is up, and thus the initial sum is up and is applied at an up-input to the AND-circuit 77. Since at this time there is a down-input at 31, the inverter 78 will apply an up-input to the AND-circuit 77, thereby to apply an up-input to the OR-circuit 80 to produce the required up-output at the sum-output 33. This, of course, is in conformity with the description of the operation of FIG. 1.

There will not be produced an up-input at the carry-output 34 for the reason that in the absence of an up-output at input-circuit 29 there will not be applied up-outputs to AND-circuits 83 and 84. Accordingly, there will not be produced an up-output at the OR-circuit 85. It may be observed that the up-output at input-circuit 30 produced an up-output on the AND-circuit 81 and through OR-circuit 82 applied an up-input to AND-circuit 83 and to AND-circuit 95. In this connection, had there been applied a carry-input as at 31 to the adder 11, this up-input would have been applied by way of conductor 92 directly to the AND-circuits 84 and 95. Since AND-circuit 95 was otherwise conditioned to conduct, there would then have been obtained an up-output transmitted through OR-circuit 85 to provide an up-output at conductor 34.

Further in connection with the adder 11, it is to be noted that there has been provided an output by way of conductor 90 connected to an AND-circuit 91 of the six-correction system 15. This output-circuit 90 is not shown in FIG. 1. It suffices here to say that output-circuit 90 forms a part of the means for selection of operations as between addition and subtraction. Thus, when the switch 25 is open, there is derived by way of conductor 90 an up-output from the inverter 86 which in conjunction with the other inputs will make the AND-circuit 91 conductive when the other two inputs are both up.

*The 4-Cycle Delay Means*

As shown in FIG. 4, the 4-cycle delay means 13 has its principal input provided by the AND-circuit 35 of FIG. 5, which supplies input pulses to the delay means 13 by way of conductor 96. The output from the delay means 13 is applied by way of conductor 97 to the OR-circuit 28. The delay means 13 also has input circuits 98 and 99 supplied with "sync." pulses by an oscillator 100. The delay means 13 includes four triggers or trigger circuits $T_1$, $T_2$, $T_3$ and $T_4$. Each trigger circuit may comprise a bistable multivibrator, such for example, as shown at page 11–301, and described in the book "Transistorized Circuits for Digital Computers," by Abraham I. Pressman, published 1959. Bistable multivibrators are well known to those skilled in the art; and for the purpose of the present disclosure, it will suffice to say that each vibrator has two inputs *a* and *b* and two outputs *c* and *d*. A negative-going input pulse at *a*-input flips the trigger to produce an up-output at *c*. Similarly, a negative-going input pulse at *b* flips the trigger to produce an up-output at *d*. The remaining triggers forming a part of the present invention operate in a similar manner. It may be observed that the triggers $T_s$, $T_e$, $T_f$ and $T_{AB}$ are provided with binary inputs. Each binary input is effective to flip its trigger from the existing stable state to the opposite stable state.

It will now be assumed that it is 1A-time and that the AND-circuit 35, FIG. 5, has applied to the conductor 96 an up-output. That output is applied to a first input of an AND-circuit 101. At 1A-time there is also applied to the AND-circuit 101 a synchronizing pulse comprising an up-output. Thus, the AND-circuit is made conductive to transmit an up-input to input *a* of trigger $T_1$. Each of the triggers is arranged so that it responds only to a negative-going pulse such as appears upon the termination of the applied synchronizing pulse. Accordingly, upon the termination of the pulse applied at input circuit *a*, trigger $T_1$ flips to produce an up-output at output circuit *c* which is applied to the AND-circuit 102.

It may here be observed that prior to the time the trigger $T_1$ has been flipped, there is an output at *d* applied to an AND-circuit 106. Thus, upon appearance of a sync. pulse at 1A-time, there is applied through a conductor 98 an up-input at the AND-circuit 106 to apply an up-input to the input circuit *b* of the trigger $T_2$. The applied pulse flips trigger $T_2$ to produce an up-output at *d*. Thus, trigger $T_2$ is reset or conditioned to receive a pulse from output *c* of trigger $T_1$.

Since trigger $T_1$ does not flip to produce an up-output at *c* until the disappearance of the pulse applied by way of conductor 96 during 1A-time, that pulse is ineffective through the AND-circuit 102 to flip trigger $T_2$ until the termination of the second sync. pulse. When that occurs, trigger $T_2$ is flipped to produce an up-output at *c* which at the termination of the third sync. pulse will, through AND-circuit 103, flip trigger $T_3$. In a similar manner at the end of the fourth sync. pulse, trigger $T_4$ will be flipped to produce an up-output to an AND-circuit 109. Upon appearance of the fifth sync. pulse, the AND-circuit 109 will transmit through conductor 97 an up-input to the OR-circuit 28 which is applied to the adder 11 for purposes already set forth in detail.

There has now been traced through the delay means 13 the manner in which a "1" from adder 11 is stored first in one and then the remaining of the triggers $T_1$—$T_4$. In the same manner there are delivered by these triggers to adder 11 the bits successively stored therein.

Assuming now that it is 4A-time, as shown in FIG. 2, it will be remembered that the binary sum from the adder 11 comprises a 0-output. Thus, with a down-input to the AND-circuit 101, there will not be applied a switching pulse in a 1 state to input *a* of trigger $T_1$. By reason of the provision of the inverter circuit 110, there will be produced an up-input to the AND-circuit 105. Thus, when the third sync. pulse is applied to AND-circuit 105 by way of conductor 98, a pulse will be applied to input *b* of trigger $T_1$. At the termination of the third sync. pulse, trigger $T_1$ will flip to produce a down-output at *c* and an up-output at *d*. This up-output is applied to AND-circuit 106 to produce upon appearance of the next sync. pulse, i.e., the fourth sync. pulse, an up-input to trigger $T_2$. Upon termination of the fourth sync. pulse, trigger $T_2$ is flipped in a direction to produce an up-output at *d* and to the AND-circuit 107. Thus, it will be seen that the 0-output first applied to AND-circuit 101 is progressively carried from one to the other of triggers $T_1$—$T_4$ until appearance of a sync. pulse at 4B-time. The output from the AND-circuit 109 will then be down and thus representative of the 0-output.

It is to be understood that the delay means 13 is in effect a storage device and that other storage devices and arrangements such as shift registers may be utilized to receive bit-by-bit the binary sum from output circuit 33 and to apply serially by bits that sum to the adder 11 during B-time.

*Binary-To-Decimal-Six Correction*

As explained above, the system for providing the binary-to-decimal-six correction is to function whenever there appears in the number parts of the input words bits representing numbers whose sum exceeds 9. The binary sum can exceed the decimal 9 in three different groups of situations; for example, when the binary sum contains a 2-bit and an 8-bit, a 4-bit and an 8-bit, or when the binary sum is produced by the addition of an 8-bit and an 8-bit.

Consideration will now be given the first situation illustrated in FIG.2, where an up-output appears at 2A-time from the output-circuit 33 of the adder 11, and an up-output appears at 8A-time from the output-circuit 33 of the adder 11.

The AND-circuits 39 and 40 during A-time have up-inputs applied to one each of three input circuits. A second of each of the AND-input circuits is connected directly to conductor 32 receiving the output of adder 11 by way of its output circuit 33. The third input to AND-circuit 39 comes from the OR-circuit 42. The third input to the AND-circuit 40 has applied thereto an up-output at 8-time.

At 2A-time, there will be an up-input to the AND-circuit 39 from adder 11 since there is an up-output applied to conductor 32. At 2-time (and therefore 2A-time), there is an up-input to the OR-circuit 42 which, through conductor 41, applies an up-input to AND-circuit 39. During A-time, the third input to AND-circuit 39 is up. Thus, at 2A-time there is applied an up-input to the lower right-hand input circuit of trigger $T_a$ of the six-correction system 15. Trigger $T_a$ is thereby flipped, at the termination of 2A-time, to produce an up-output applied to AND-circuit 91. It will be remembered that another of the inputs to the AND-circuit 91 is always up during addition (through the connection to conductor 90) while the third input of the AND-circuit 91 is derived from the upper right-hand output circuit of trigger $T_b$, which is down. Nothing further happens in the correction system 15 until 8A-time. This is so since at 4A-time, the output of output circuit 33 is down. At 8-time (including 8A-time), all three inputs to AND-circuit 40 are up, and there is thus applied an up-input to the lower right-hand input circuit of trigger $T_b$. Upon termination of the up-input, the trigger $T_b$ flips to produce an up-output to the AND-circuit 91. This AND-circuit, already conditioned for conduction, produces an up-input to OR-circuit 112. This OR-circuit applies an up-input to AND-circuit 47. Since, however, it is neither 2-time nor 4-time (because it is 8A-time), the AND-circuit 47 does not transmit a pulse to the adder 11.

At B-time, there is applied from the timing circuit 50 by way of conductors 113 and 114 an up-input to the triggers $T_a$ and $T_b$. These inputs are continuously up during B-time as illustrated at line B of the timing chart of FIG. 2. Accordingly, neither trigger is flipped from its above-described state until the termination of the applied pulse.

It is to be noted that the B-pulse is also applied to the lower input circuit of $T_c$. This trigger has its upper right-hand output forming an input to the OR-circuit 112, and it has its lower right-hand input connected to an AND-circuit 115. The AND-circuit 115 has one input circuit connected to the timing circuit to provide an up-input at 1B-time. The other input to the AND-circuit 115 is connected by conductor 116 to the AND-circuit 123. It will be remembered that a 8A-time, there was not present a carry from the adder 11, that is, the carry was down. Therefore, at 1B-time, there will be a down-output from the AND-circuit 123 of the one-cycle delay 14. Accordingly, there will be a down-output from AND-circuit 123 to AND-circuit 115. For this reason the trigger $T_c$ is not flipped. There will be a down-output from trigger $T_c$ to OR-circuit 112.

Since AND-circuit 91 has applied an up-input to OR-circuit 112 and to AND-circuit 47, at 2B-time, it will be evident that there is an up-output from AND-circuit 47 since there in an up-output from OR-circuit 42. Accordingly, at 2B-time there is applied to the OR-circuit 27 an up-input. Concurrently, there is applied an up-output from the delay means 13 by way of conductor 97 to OR-circuit 28. Thus, with both inputs 29 and 30 of the adder 11 up, its output at 33 will be down, but there will be an up-output at 34 which, through OR-circuit 44, is applied to the one-cycle delay means 14.

In a similar manner at 4B-time, there will be applied through OR-circuit 42 and AND-circuit 47 an up-input to the OR-circuit 27 and thus to the adder 11. At 4B-time, the output from the 4-cycle delay means 13 will be down. However, the previously stored "1" in the one-cycle delay means 14 now appears at the AND-circuit 123 and by conductors 116 and 31 is applied to the adder 11. As a result, both inputs at AND-circuit 84 are up which transmits through OR-circuit 85 and up-output, a carry, to the OR-circuit 44, and thence to the delay means 14. There is a down-output at 33 by reason of the up-inputs to and the down outputs from the inverters 76 and 78.

From the foregoing it will be seen that the six-correction system 15 has in binary notation (0110) added a decimal-six to the binary sum which through the 4-cycle delay 13 was applied to the adder 11. At 8B-time, the output from AND-circuit 47 is down since the input thereto from OR-circuit 42 is also down.

There will now be described the operation of the correction system 15 for the second condition, namely, when at 4A-time, the output at 33 is up and at 8A-time the output at 33 of the adder 11 is up. The operations are identical with those described for the preceding condition except that the three inputs to the AND-circuit 39 will all be up at 4A-time instead of at 2A-time as occurred in the previous case. In all other respects, the six-correction system applies during B-time the decimal-six correction and in the manner shown in the "Six-Correction" line of FIG. 2.

For the third condition, where at 8A-time both inputs X and Y are up, it will be seen at once that the AND-circuit 39 always has a down-input from the output circuit 33 of the adder 11 during 2A and 4A-times Hence, trigger $T_a$ is never turned on during the assumed conditions. Since two up-inputs to the adder 11, as at 8A-time, produce a down-output at 33, it will be seen that the AND-circuit 40 also will have a down input and, therefore, trigger $T_b$ will not be turned on. Remembering that the addition of two "1's" at 8A-time results in a carry, that is, an up-output at conductor 34, it will be seen that the up-output applied to the OR-circlit 44 enters the carry into the one-cycle delay 14. The stored "1" appears at 1B-time as an output applied to conductor 116 and thence to AND-circuit 115 of the correction system 15. Since at 1B-time both inputs to AND-circuit 115 are up, and up-input is applied to the lower right-hand input circuit of trigger $T_c$ which is turned on at the end of 1B-time to produce an up-output which is applied to the OR-circuit 112. Thus, the AND-circuit 47 by the up-output from trigger $T_c$ is conditioned to be conductive at 2B-time and at 4B-time. In this way there is introduced into the adder system 11 the decial-six correction already described in binary form as 0110. It is to be further observed that the lower left-hand input circuit of trigger $T_c$ is energized by way of conductors 113 and 144 during B-time. However, trigger $T_c$ does not respond until the end of B-time when the applied input is negative-going. When that occurs, the trigger $T_c$ is flipped to its original condition preparatory to the next operation.

From the foregoing it will be seen that provision has been made for the introduction of the decimal-six correction as required for all of the possible conditions to be encountered.

During the first two conditions, the sum of the numbers introduced at inputs X and Y can range from 10 to 15. During the third condition the sum of the numbers can range from 16 to 18. The third condition is a special one in which there is not only to be introduced the decimal-six correction but also there must be produced a carry during 8B-time. This carry during 8B-time is developed by the trigger $T_c$. When trigger $T_c$ applies to the OR-circuit 112 the above-described up-output, it at the same time applies through a conductor 118 an up-input to the AND-circuit 48. This AND-circuit will have both of its inputs up at 8B-time, and will then apply to the OR-circuit 44 an up-input to be entered into the delay means 14. Thus, at 1A'-time, the one-cycle delay means 14 will apply by way of condutor 116, AND-circuit 45 and conductors 51 and 31 an up-input to the adder 11 which will respond thereto in the same manner as to the carry inputs previously described.

Before concluding the description of the six-correction system 15, it may be observed that during the subtraction process later to be described the input to the AND-circuit 91 will be down by reason of the down-input at conductor 90 connected to the output of inverter 86. As a result, the triggers $T_a$ and $T_b$ are made ineffective during the subtracting process. This conforms with theory inasmuch as the binary-to-decimal-six correction is to be utilized only as a result of the requirement of a "borrow."

A borrow requirement appears whenever the subtrahend introduced at input Y is greater than the minuend introduced at X. When that event occurs, there will appear at circuit 34 an up-output which will be applied to the one-cycle delay means 14 When the borrow occurs at 8A-time, there will be produced from the delay means 14 an up-output at 1B-time which will then be applied through the AND-circuit 115 to turn on the upper right-hand output of the trigger $T_c$ at the end of 1B-time. Accordingly, during 2B and 4B-times there will be introduced the decimal-six-correction to the subtracter 11, and there will be applied to the AND-circuit 48 at 8B-time two up-inputs to introduce through the OR-circuit 44 an up-input to the delay means 14. Thus, during the next cycle 1A'-time there will appear a borrow-input applied by way of conductor 116 AND-circuit 45 and conductors 51 and 31 to the subtracter 11, the borrow thereby being taken from the next higher decimal digit.

*The One-Cycle Delay*

As has already been made clear, the one-cycle delay means 14 is provided for the purpose of storing for one cycle a "1," an up-input, and for producing an up-output at the next cycle to deliver the "1" to the system during the next cycle. More particularly, when there is an up-input applied to the OR-circuit 44, there is applied to an AND-circuit 121 an up-input. Also applied to the AND-circuit 121 by way of the conductors 98, 99 and 122 are the sync pulses. Accordingly, when there is an up-input to OR-circuit 44, there is produced on the lower right-hand input of the trigger T an up-input which upon termination of a sync pulse is flipped to produce an up-output to an AND-circuit 123. When the next sync pulse appears, it is applied by way of conductors 98, 99, 122 and 124 to the AND-circuit 123 to produce an up-output which is applied to conductor 116. Upon disappearance of an up-output at the OR-circuit 44, the inverter 125 produces an up-output to an AND-circuit 126. This AND-circuit is made conductive by one of the sync pulses and applies to the lower left-hand input circuit an up-input which at the end of the sync pulse flips the trigger to apply a down-output to its output circuit connected to AND-circuit 123. Thus, a 1-input is stored or delayed for one cycle and then delivered to output conductor 116.

*The Parity Bit Counter 16*

As previously described, the parity bit counter 16 responds only during 4B-time to the X and Y input circuits, since it is only during 4B-time that the two AND-circuits 23 and 24 have up-inputs applied to one each of their two input circuits. If at 4B-time a parity bit appears at the Y-input, there is applied by AND-circuit 23 an up-input to an inverter 130 and an up-input to an AND-circuit 131. The up-input to the inverter 130 produces a down-input to an AND-circuit 132. If at the time the Y-input is up a parity bit also appears at the X-input, then there will be an up-input applied to the AND-circuit 24. The result will be the application of an up-input to an inverter 133 which produces a down-input to an AND-circuit 131. It will thus be seen that with inputs X and Y both up, both inputs to the OR-circuit 134 will be down. A down-output from OR-circuit 134 applied to an inverter 135 produces an up-output applied to AND-circuit 136. The down-output from the OR-circuit 134 prevents transmission of pulses through an AND-circuit 137 which has its other input connected to an inverter 138. Whether or not the AND-circuit 136 will be conductive will depend upon whether or not there is an up or a down-input applied to its other input circuit connected to conductor 51. If there appears a carry (or a borrow) at the output of the one-cycle delay at 4B-time, there will be applied by way of AND-circuit 45 an up-input to conductor 51 and thence to the AND-circuit 136. As a result, there will be an up-output from an OR-circuit 139 which is applied by way of conductor 52 to the parity bit generator 17.

In summary, when the three inputs X, Y and 51 of the counter 16 are up at 4B-time, there will be an up-output from the parity bit counter 16. When inputs X and Y are up and input 51 is down, the output of the parity bit counter 16 will be down. If the output from the one-cycle delay means 14 is down, there will be an up-output from the counter 16 when there is an up-input at either Y or X, but not at both. If both inputs Y and X are down and there is an up-output from the output of the one-cycle delay means 14, there will be an up-output from the counter 16. It will thus be seen that the parity bit counter produces an up-output when the applied bits are present in odd numbers (1 and 3) and down when the applied bits correspond with even numbers (0 and 2).

Further in connection with the input 51 to the counter 16 from the one-cycle delay means 14, it is to be observed that the counter 16 is effective to receive pulses during all of A-time and during all B-time except 1B-time. The inverter 46 renders the AND-circuit 45 non-conductive during 1B-time. At all other times, however, if there should be up-outputs from the one-cycle delay means 14, they will be applied directly through the AND-circuit 45 and the conductor 51 to the AND-circuit 136 which will be conductive at all times other than for the possibility of being non-conductive at 4B-time. Thus, except for 1B and 4B times, the output at conductor 52 will be up or down to correspond with an up- or down-input at conductor 51. The foregoing means that the parity bit counter 16 keeps track of the counts, borrows or carries from the one-cycle delay means 14 excluding, of course, any that appear at 1B-time. Any output from delay means 14 at 1B-time produces through operation of trigger $T_c$ a carry (or a borrow) which is entered into delay means 14 during 8B-time.

In order to keep track of parity bits and at the proper time to apply them to the system output terminal 12 by way of the OR-circuit 37, there is provided the parity bit generator 17.

*The Parity Bit Generator 17*

The parity bit generator 17 has four inputs, one from counter 16 by way of conductor 52, one from the B-output of the timing circuit by way of conductor 140, and the third and fourth by way of conductors 141 and 149 to the 4A and 1B outputs, respectively, of the timing circuit. The input conductor 140 applies an up-input to the binary input of trigger $T_s$ during the whole of B-time, but which, as noted above, does not flip trigger $T_s$ until the end of B-time. By applying the input from conductor 140 to the binary input to trigger $T_s$, the trigger $T_s$ will be flipped at the end of B-time from the state it is then in into the opposite state. The parity bit generator 17 includes not only the switching trigger $T_s$ but also two counting triggers $T_e$ and $T_f$.

It will be assumed for the purposes of the present description that the switching trigger $T_s$ is in a state in which there is an up-output at *c* applied to the AND-circuit 143, an up-output at *d* from the trigger $T_f$ and a down-output at *d* from trigger $T_e$. A feature of the present invention is that when one of the triggers $T_e$ and $T_f$ is counting, the other is storing the previous count. Under the assumed conditions, the trigger $T_f$ will be counting and the trigger $T_e$ will be storing. Thus, if there is an up-input at conductor 52, the AND-circuit 143 will apply to the binary input of trigger $T_f$ an up-input which will on disappearance of the pulse produce a down-output at *d*. Upon the appearance of the next bit in a "1" state, the trigger $T_f$ will be returned to the assumed state for application to the AND circuit 147 of an up-input. Thus, it will be seen that for every even number of counts, there will be an up-output at *d* from the counting trigger $T_f$. The count will be made during the appearance of a word, that is, during the whole of A-time (the number part) and during the whole of B-time (the parity part), since the trigger $T_s$ is not changed from its assumed state until the end of B-time.

At the end of B-time, the trigger $T_f$ will have an up-output or a down-output at *d* depending upon whether during the appearance of the first word there was produced an even or an odd count. In conformity with FIG. 7, it will be assumed at the end of B-time the parity count was odd. Therefore, the output from trigger $T_f$ will be down. At the end of B-time, trigger $T_s$ flips. Therefore, one of the inputs to AND-circuit 143 is then down and remains down during the whole of the next-appearing word for the reason that switching trigger $T_s$ remains with its upper right-hand *c* output-circuit down until it is again switched at the end of B′-time. Thus, the trigger $T_f$ now assumes the function of storing the odd-count which it had just made.

When the trigger $T_s$ is flipped at the end of B-time, it produces from its upper left-hand *d* circuit an up-output applied to AND-circuit 147 and to AND-circuits 144 and 145. The result is in part the transfer of the input circuit 52 from AND-circuit 143 to AND-circuit 144. In this manner, the input pulses from the parity bit counter 16 are now applied by way of AND-circuit 144 to the binary input trigger $T_e$ which now takes on the counting function for the parity count of the next (in FIG. 7 the second) word.

So far there has not been described the purpose of the input circuit 141 from the 4A-output of the timing system 50. The input conductor 141 produces an up-input for AND-circuits 147 and 148 at 4A-time. If at 4A′-time either of AND-circuits 147 and 148 has their remaining two inputs up, there will be applied to the OR-circuit 37 an up-output to produce in the system output circuit from terminal 12 a parity bit at 4A′-time. This parity bit appears at 4A′-time since it will be remembered that the number part of the output word is applied to the output terminal 12 during B-time. Inasmuch as it has been previously assumed that at the end of B-time the output *d* of the trigger $T_f$ was down, then at 4A′-time when both the other inputs to AND-circuit 147 are up, there will not be applied an up-input to the OR-circuit 37. The parity bit produced at terminal 12 at 4A′-time will be a "0." Had there been an even count by the trigger $T_f$ with an up-output to AND-circuit 147, then the parity bit at 4A′-time would have been up, that is, corresponding to a "1" in binary notation. The foregoing description equally applies to the operation of trigger $T_e$ as a counter and also in respect to the parity bit output from AND-circuit 148 which occurs at 4A″-time.

It will be recalled that at 4A′-time the AND-circuit 147 has two up-inputs, the third being the connection to the output *d* of trigger $T_f$. Thus, there is "read" the stored count of trigger $T_f$. The trigger $T_f$ is at 1B′-time reset by reason of the application to its lower left-hand *b* input circuit of an up-input obtained as follows. At 1B′-time, there is an up-input applied by way of a conductor 149 to AND-circuit 145. The other input to this AND-circuit 145 is up by reason of its connection to the *d* output circuit of trigger $T_s$. Thus, there is an up-input from AND-circuit 145 applied to input *b* of trigger $T_f$ to produce an up-output from output *d*, i.e., to return it to the condition first assumed.

In a similar manner, at the end of the second word corresponding with the termination of B′-time, the switching trigger $T_s$ has its upper right-hand *c* output up. This conditions the AND-circuit 146 to be conductive so that at 1B″-time it applies an up-input to the trigger $T_e$ to reset it .

In summary, the parity bit counter 16 and the parity bit generator 17 function in conjunction with the system as a whole to apply to output 12 a parity bit in the parity position of each output word whenever there is an even number of "1's" in the number part of each output word appearing in the final system output at terminal 12. In the example described above, there appears in the final system output an odd number of "1's" in all the number parts of the three output words. Accordingly, at 4A′, 4A″ and 4A‴ times (the latter not shown in FIG. 7), the parity bit is in each case a "0."

Referring now to FIG. 7, it will be seen that for the assumed example, there are four down-outputs during A-time from the one-cycle delay means 14. Accordingly, the counting trigger $T_f$ during A-time has an up-output. At 4A-time, there is present a down-input to each of AND-circuits 147 and 148. The down-input to AND-circuit 147 is from output *d* of trigger $T_s$ and the down-input to AND-circuit 148 is from output *d* of trigger $T_e$ (that trigger's assumed initial condition). The parity bit at 4A-time is therefore a "0." At 1B-time, AND-circuit 146 applies a reset pulse to storing trigger $T_e$ which at the end of 1B-time is reset for an up-output at *d*. Trigger $T_f$ continues to count since it is not yet the end of B-time.

There are down-inputs to the parity bit counter 16 until 4B-time. There are then applied up-inputs from input X to AND-circuit 24 and from the one-cycle delay means 14 to AND-circuit 136. Therefore, the output at 52 is down. At 8B-time, there is an up-input to counter 16 from delay means 14. Hence, an up-output appears at output 52 which is applied as an up-input to the AND-circuit 143 in conjunction with the up-input from output *c* of trigger $T_s$. Trigger $T_f$ at the end of 8B-time flips to produce a down-output at *d*. Trigger $T_s$ now flips (end of B-time) to connect trigger $T_e$ as the counting trigger. At 4A′-time the "0" parity bit is read from the output *d* of storage trigger $T_f$.

There is an output from delay means 14 at 1A′, 2A′, 4A′, and 8A′-times. Accordingly, counting trigger $T_e$ is actuated an even number of times during A′-time to leave an up-output applied to AND-cicuit 148 until 4B′-time.

At 1B′-time, the two up-inputs to AND-circuit 145 reset trigger $T_f$ with its output *d* up. At 4B′-time, the counter 16 has its Y-input up and its input 51 up. Accordingly, there is a down-output from conductor 52 to the generator 17.

At 8B′-time, there is an up-input from delay means 14 applied by conductor 51 to produce an up-output from the counter 16. This up-output is applied to AND-circuit 144 which at the end of 8B′-time causes trigger $T_e$ to flip to produce a down-output at *d*. This down-output is read at 4A″ time.

Since it is now the end of B′-time, trigger $T_s$ flips to leave the count stored at trigger $T_e$ and to start the next count by trigger $T_f$.

At 1A″ time, there is an up-output from delay means 14, from counter 16 and through AND-circuit 143 to the binary input of trigger $T_f$. This trigger $T_f$ flips at the end of 1A″ time to produce a down-output at *d*. This down-output is read at 4A‴ time. At 4A″ time, the down-output of storing trigger $T_e$ is read as the "0" parity bit. At the end of 1B″ time, the trigger $T_e$ is reset.

*The Timing Circuit*

Referring to FIG. 4, the "Timing Circuit" 50 will be seen to have some similarities to the 4-cycle delay means 13, that is to say, it includes triggers $T_1$, $T_2$, $T_4$ and $T_8$ which have been labeled to conform with the 1, 2, 4, 8 code together with an additional trigger $T_{AB}$. By reason of this labeling, it will be easier to follow the succession of operations which produce the pulses at the specified times set forth above.

At 1A-time, there will be an up-output from the trigger $T_{AB}$ for the conductor A. There will also be an up-output at the conductor 1 of trigger $T_1$. The remaining triggers will have down-outputs at conductors 2, 4 and 8 with up-outputs from each of their upper left-hand output circuits. Thus, at 1A-time, there is only required the one output already described as being applied to conductor A.

At 1A-time, there was applied from the oscillator 100 a sync. pulse by way of conductors 98 and 150 to one of the inputs of AND-circuit 152. From output conductor 1 of trigger $T_1$, an up-input is also applied to AND-circuit 152. Though there is a pulse applied through AND-circuit 152 to the trigger $T_2$, it will be remembered that this trigger will not flip until after the disappearance of the sync. pulse. At the end of 1A-time, the sync. pulse terminates and the trigger $T_2$ flips to cause an up-output to be produced at its output conductor 2.

It is to be observed that AND-circuit 155 during 1A-time had applied to it two up-inputs, one a sync. pulse and the other the up-output from the upper left-hand output circuit of trigger $T_8$. Thus, the AND-circuit 155 applies an up-input to the lower left-hand input circuit which upon termination of the sync. pulse flips trigger $T_1$ to produce a down-output at its output conductor 1 and to apply an up-input to one of the inputs of the AND-circuit 156. The sync. pulse during 2A-time appears at the AND-circuit 156 and also at the AND-circuit 153. They apply respectively to triggers $T_2$ and $T_4$ inputs which at the end of 2A-time are effective to flip trigger $T_2$ to produce a down-output at conductor 2 and to flip trigger $T_4$ to produce an up-output at conductor 4. It will be noted that conductor 4 has a connection to an AND-circuit 161 for applying an up-input thereto. There is also applied from the output conductor A from trigger $T_{AB}$ an up-input for producing the timing pulse during 4A-time, the output from the AND-circuit 161 being labeled 4A.

When the next sync. pulse is applied, it is effective through AND-circuits 154 and 157 at its termination to flip triggers $T_4$ and $T_8$. Thus, trigger $T_8$ applies through its output conductor 8 a pulse during 8A-time.

The trigger $T_8$ also applies through its output conductor 8 and by way of conductor 165 an up-input to the binary input of trigger $T_{AB}$.

The next sync. pulse is effective through AND-circuits 151 and 158 so that upon its disappearance trigger $T_8$ flips to apply a down-output to its output conductor 8. Thereupon, trigger $T_{AB}$ flips to produce a down-output at conductor A and to produce an up-output at conductor B. This marks the beginning of the up-output for the conductor B as applied to the control circuits as above described.

With an up-output at output conductor 1 of trigger $T_1$, it can be seen that there is an up-input applied to the AND-circuit 159 which also has an up-input from the B conductor of trigger $T_{AB}$. Thus, the AND-circuit 159 applies an up-input to its conductor 1B during 1B-time.

Through the successive action of the AND-circuits 152, 155; 153, 156; 154, 157, the triggers $T_2$, $T_4$, $T_8$ in succession produce up-outputs at 2B, 4B and 8B-times. The output conductor 4 of trigger $T_4$ applies an up-input to AND-circuit 160. This AND-circuit has a second input which is up by reason of its connection to the conductor B of trigger $T_{AB}$. Accordingly, conductor 4B provides an up-input to the inverter 26 of FIG. 5 and to the AND-circuits 23 and 24 of FIG. 6. In a similar manner there is an up-output produced from AND-circuit 162 for its conductor 8B.

At the end of B-time, trigger $T_8$ is again flipped and causes trigger $T_{AB}$ to return to its original state for the beginning of A′-time. The triggers $T_1$, $T_2$, $T_4$ and $T_8$ again operate in succession to produce up-outputs at 1A′, 2A′, 4A′ and 8A′-times. At the end of 8A′-time, trigger $T_{AB}$ is flipped and the triggers produce up-outputs at 1B′, 2B′, 4B′ and 8B′ times. In similar manner, the triggers continue the timing chain of pulses during the subsequent A and B times.

*The Adder-Subtracter 11*

When it is desired to operate the adder-subtracter 11 for the subtraction of numbers appearing at the Y input from numbers appearing at the X input, it is only necessary to close the switch 25. This may be done manually or automatically in conjunction with other systems as may be desired. Upon closure of the switch 25, there is provided an up-input to a control circuit, which it will be noted applies an up-input to the AND-circuit 89 and produces a down-input to the AND-circuit 81 and to the AND-circuit 91 of the six-correction system 15. The change from the conditioning of AND-circuit 81 to be conductive to the conditioning of the AND-circuit 89 to be conductive has the effect of taking from the output of inverter 72 a signal for the AND-circuit 89 instead of taking that signal from the input of the inverter 72. Symbolically, instead of AND-circuit 81 being conditioned to be conductive when there is an up-input at X, indicating a "1," the AND-circuit 89 is made conductive at X, that is, when the input at X is down, representing a "0." Thus, there appears at the output of the AND-circuit 89 an inversion of the bits appearing at the X input. The change in operation meets all the requirements for subtraction and likewise the blocking of AND-circuit 91 changes the operation of the six-correction system 15 in manner now to be described.

During the subtraction process, the binary-to-decimal-six correction is only applied when there is a borrow from one decimal digit to the next highest order of decimal digits. Accordingly, by blocking the AND-circuit 91 by the down-output from inverter 86, there will be produced the decimal-six correction only when there is a borrow applied, as by an up-output from the one-cycle carry 14 to the AND-circuit 115 at 1B-time. When this up-borrow-output is so applied to AND-circuit 115, there is at the appropriate time subtracted a decimal six from the difference then being resubmitted to the adder-subtracter 11.

Numerical examples will clarify the foregoing operations. If 9 be subtracted from 14, there will not be applied the decimal-six correction. Thus, the number 14 as applied to input X forms the minuend in binary form as follows: 0111. The subtrahend of 9 is applied to input Y in binary form as follows: 1001. The foregoing problem will now be solved by the arithmetic system of the present invention. It will be remembered that there will be a down-input at X corresponding with the 0-input for the 1-bit and up-input at Y corresponding to the 1-input for the 1-bit. The difference appears as an up-output at 33 and also by an up-output at 34 representing a borrow. With Y up and X down, the up input is transmitted by way of AND-circuit 19, the OR-circuit 27, thence to the AND-circuit 74, the OR-circuit 75, the AND-circuit 77 and through the OR-circuit 88 to the output 33. The up-input at Y is applied by way of the conductors 87 and 88 to AND-circuit 83. This AND-circuit 83 is conductive by reason of the up-inputs at AND-circuit 89 which through OR-circuit 82 applies an up-input to AND-circuit 83 to produce through OR-circuit 85 the up-output for the borrow output circuit 34. Thus, this up-output at 34 is entered through the OR-circuit 44 into the one-cycle delay means 14.

The next cycle which occurs at 2A-time includes the application of an up-input to X and a down-input to Y for the respective 2-bits of the code; and by means of the one-cycle delay 14, an up-borrow input by way of conductor 31. With the minuend and the borrow-inputs up and the subtrahend input down, there will be a 0-output at 33 and also at 34.

At 4A-time, the X-input will again be up and the Y and borrow inputs down for the respective 4-bits to produce an up-output at 33. At 8A-time, both inputs X and Y are up to produce a down-output at 33 and a down-output at the borrow output 34.

As in the case of addition, previously described, the results of the subtraction are through the AND-circuit 35 applied to the 4-cycle delay 13 so that at 1B-time the difference as recorded above is serially resubmitted to the adder-subtracter 11. Since the borrow output was down at 8A-time, there will not be produced from the one-cycle delay 14 an up-output at 1B-time, the trigger $T_c$ will not be flipped, and there will not be subtracted a binary-coded-decimal of six. The adder-subtracter 11 will subtract from the resubmitted difference a binary-coded decimal of 0 to read out the initial difference of 1010 which is the binary answer of 5 resulting from the subtraction of 9 from 14.

Had the problem been the subtraction of 14 from 9, a different operation would have been required. For this example at 1A-time the X-input is up and the Y-input down to produce an up-output at 33 and a down-output at 34. At 2A-time, the X-input is down and the Y-input up. This produces an up-output at 33 and also an up-output at the borrow-output circuit 34. This is entered into the one-cycle delay 14 so that at 4A-time when there is applied a down-input at X and an up-input at Y there is also an up-input at 31 to produce a down-output at 33 and an up-output at 34. This up-output at borrow 34 is again entered into the one-cycle delay 14 so that at 8A-time with both X and Y inputs up as well as borrow input 31 there is produced an up-output at 33 and a borrow or up-output at 34. The up-output at 34 is again applied to the delay means 14.

At 1B-time, the last-mentioned borrow entered into the delay means 14 is applied by way of conductor 116 to AND-circuit 115 which at the same time has an up-input at 1B-time from the timing circuit 50. Thus, at the end of 1B-time, the trigger $T_c$ is flipped to apply an up-input to the OR-circuit 112 and thence to the AND-circuit 47. Thus, as the difference is being read out of the 4-cycle delay means 13, there will be subtracted therefrom the binary-to-decimal correction of six which in binary notation is 0110. The result of this subtraction (1101 minus 0110) will be to produce an output of 1010 which is the binary form of 5, five being the correct answer resulting from the subtraction of 14 from 9. In addition, trigger $T_c$ applies an up-output to AND-circuit 48 which is caused to conduct at 8B-time and apply an up-input to the one-cycle delay means 14. The resulting up-output of the delay means 14 at 1A′-time is applied to the borrow input 31 of the adder-subtracter 11 and borrows a "1" from the 1-bit of the next higher decimal digit.

It is believed that with the above-detailed description of the operation of each of the component parts of the system of FIGS. 4–6 inclusive, it will be unnecessary, beyond the table of FIG. 7, to trace through a sample problem embodying all of the individual components making up this system.

It is to be understood that the AND-circuits in many instances act as gates or gating circuits for certain of the components. For example, the AND-circuits 23 and 24 of the parity bit counter act as gates for that counter. The AND-circuits and the OR-circuits are well understood by those skilled in the art and any of the various forms thereof may be utilized. This observation equally applies to the trigger circuit. Many examples of the various components may be found in current textbooks.

Again referring to the system of FIGS. 4–6 now operating for addition, the operation chart of FIG. 7 supplies not only the inputs at Y and X but also the corresponding outputs in binary notation at the several significant points in the system which have already been discussed at length. FIG. 7 likewise includes the outputs from the timing circuit 50 together with the outputs from the trigger circuits included as part of the parity bit generator 17. In the description of the generator 17 the manner in which the parity bits were produced and applied to the output 12 was set forth at some length.

In summary, it is to be understood that certain features of the invention may be utilized without other features thereof. More particularly, the parity bit counter and the parity bit generator may or may not be included depending upon the requirements of particular systems.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A serial digital computer comprising a full adder having two code inputs, a carry-input, a sum-output and a carry-output, code-applying means for serially applying a plurality of words concurrently to each of said inputs, each of said words having a binary-coded-decimal number part, said full adder including first means for adding together said number parts to produce an initial sum, one-cycle delay means, means connecting said one-cycle delay means between said carry-output and said carry-input of said full adder, said full adder including additional means for performing an addition operation on said initial sum and on said carry-input to produce at said sum-output a first binary-coded-decimal sum, multiple delay means providing a serial delay to each of the bits applied thereto of a time duration at least equal to the time duration of the number part of said words, means connecting said multiple delay means between said sum-output and one of said code-inputs, a correction system connected to said sum-output for producing a binary-coded-decimal number representing the decimal-six when said first binary-coded-decimal sum has a decimal equivalent greater than nine and for producing a binary-coded decimal number representing the decimal zero when said first binary-coded-decimal sum has a decimal equivalent of nine or less, and means for applying the output of said correction system to the other of said code inputs of said full adder in time sequence with said resubmitted binary-coded-decimal sum.

2. The computer of claim 1 in which said full adder includes modifying means having three inputs, means for applying said number parts and said output of said one-cycle delay means to a respective one of said three inputs for producing a bit in a "1" state at said carry output when at least two of said three inputs are in a "1" state and for producing a bit in a "0" state at said carry-output when one or none of said three inputs is in a "1" state.

3. The computer of claim 2 in which said full adder includes means for inverting one of said number parts applied to one of said three inputs for producing subtraction of the other one of said number parts from said one of said number parts.

4. The computer of claim 1 in which said full adder includes control means for inverting one of said number parts for producing subtraction and the other one of said number parts from said one of said number parts.

5. The computer of claim 4 in which said full adder includes carry-borrow means having three inputs, means for applying said inverted number part, the other one of said number parts and said output of said one-cycle delay means to a respective one of said three inputs whereby a bit respective of a borrow in a "1" state is applied to said input of said one-cycle delay means when at least two of said three inputs are in a "1" state and whereby a bit respective of a borrow in a "0" state is applied to said input of said one-cycle delay means when one or none of said three inputs is in a "1" state.

6. The computer of claim 1 in which said binary-coded-decimal number parts are in the form of the code 1, 2, 4, 8; and in which said multiple delay means has four stages for storing the four sums for the 1, 2, 4, 8 binary digits of the number parts of said words.

7. The computer of claim 6 in which said correction system includes means for applying for the first binary-coded decimal sums of 16, 17 and 18 a 1-input to said one-cycle delay means whereby there is applied to the next higher decimal digit a carry from the word in which there were obtained said first binary-coded decimal sums of 16, 17 and 18.

8. The computer of claim 7 in which said correction system comprises three trigger circuits, two AND-circuits and an OR-circuit, two of said trigger circuits and one of said AND-circuits producing a 1-output from said OR-circuit upon addition of numbers producing sums between 10 and 15 and the remaining trigger circuit and the other AND-circuit producing a 1-output from said OR-circuit when said sum is 16, 17 or 18, and in which there is provided an additional AND-circuit having two inputs, said decimal-six being applied to said full adder by way of said additional AND-circuit, one of said inputs of said additional AND-circuit being connected to said OR-circuit, and means connected to said other input of said additional AND-circuit for applying 0-inputs at the 1-bit time and at the 8-bit time of said 1, 2, 4, 8 code and for applying 1-inputs at 2-bit time and at 4-bit time, thereby to add said decimal-six in the form of input signals corresponding with 0110 in said 1, 2, 4, 8 code.

9. The computer of claim 1 in which said multiple delay means has four trigger circuits forming four stages, each said trigger circuit having two input circuits, three of said trigger circuits having two output circuits and the remaining trigger circuit having a single output circuit, an AND-circuit for each said input circuit and an additional AND-circuit, each AND-circuit having two inputs, means for applying simultaneously timing pulses to one of said inputs of each of said AND-circuits, connections between the other input of six of said AND-circuits and said outputs of said three trigger circuits to form a shift register type of circuit, and means including an inverter connected to the other input of one of the remaining two AND-circuits, said additional AND-circuit having the other of its inputs connected to said single output circuit for producing a serial read-out after said four-cycle delay of the received input information.

10. The computer of claim 9 in which there is provided a four-stage ring circuit of the closed type including four trigger circuits and four pairs of AND-circuits, said circuit also including an additional trigger circuit for providing two outputs, one of which is in a "1" state during the whole of the number part of each word and the other of which is in a "1" state during the whole of the time said multiple delay means is resubmitting said first sums to said full adder.

11. The computer of claim 6 in which each said applied words has a four-position number part and a four-position parity part, a minimum of one of said positions of said parity part being used for parity bits, and in which there is provided a parity counter having three inputs and one output, gating means for selecting from said succession of bits said parity bits and for applying them to two of said inputs of said parity counter, and means for connecting the output of said one-cycle delay means to said third input of said parity counter for producing from said counter a 1-output when there is an odd number of 1-inputs to said counter and for producing a 0-output when there is none or an even number of 1-inputs applied to said parity counter.

12. The computed of claim 11 in which there is provided a parity bit generator having counting means for alternately counting the number of 1-outputs of said parity counter during the time duration of each of said words and storing them, means operable after the count of said 1-outputs in a word for applying a parity-bit to an output of said computer at a parity-bit position, and means for resetting the counting means after the stored count has produced said parity bit.

13. The computer of claim 1, in which there are provided means for operating said full adder as a subtracter comprising a first inverter, an output of which is in a "1" state when its input is in a "0" state, means including an energizing system for applying a 1-input to said first inverter input for producing a 0-output therefrom, and a pair of AND-circuits each having two inputs, one of said inputs of one of said AND-circuits being connected to the input of said first inverter and one of said inputs of the other of said AND-circuits being connected to the output thereof, said full adder having a second inverter in series in one of its inputs to which the minuend is applied, and means connecting the other of said inputs of each of said AND-circuits, one to the input and the other to the output of said second inverter.

14. The computer of claim 1 in which there is provided a control circuit deenergized for producing addition, and means energizing said control circuit for producing subtraction of the number parts of one plurality of words from the corresponding number parts of the other of said concurrently applied plurality of words.

15. The computer of claim 6 in which there is provided a control circuit deenergized for producing addition, and means for energizing said control circuit for producing subtraction of the number parts of one plurality of words from the corresponding number parts of the other of said concurrently applied plurality of words.

16. The computer of claim 15 in which there are provided means responsive to energization of said control circuit for operating said correction system to subtract a binary-to-decimal-six correction during resubmission of the difference between said number parts under conditions requiring a borrow from its next higher decimal digit, and means for applying a 1-input to said one-cycle delay means upon completion of said substraction of said six-correction from said resubmitted difference.

17. A serial digital computer comprising a full-adder having two code inputs, a carry-input, a sum-output and a carry-output, code-applying means for serially applying a plurality of words to each of said inputs, each of said words being comprised of a binary-coded-decimal number part and a parity part, said parity part of said word including a parity bit, first delay means, means connecting said first delay means between said carry-output and said carry-input of said full-adder to delay by one cycle the carry-output bits to produce at said sum-output a first binary-coded-decimal sum, second delay means, means connecting said sum output to said second delay means, means connected to said second delay means for serially resubmitting said first binary-coded-decimal sum to one of said code inputs of said full-adder at a predetermined time after application to said second delay means of the last bit of said first binary-coded-decimal sum, correction-producing means, means providing connections from said sum-output to said correction-producing means, said correction-producing means producing a binary-coded decimal number representing the decimal-six when said first binary-coded-decimal sum has a decimal equivalent greater than nine and producting a binary-coded-decimal number representing the decimal zero when said first binary-code-decimal sum has a decimal equivalent of nine or less, and means connecting the output of said correction-producing means to the other of said code inputs of said full-adder, said binary-coded-decimal produced by said correction-producing means being applied in time sequence with said resubmitted first binary-coded-decimal sum.

18. A serial digital computer comprising a full-adder having two code inputs, a carry-input, a sum-output and a carry-output, code-applying means for serially applying a plurality of words to each of said inputs, each of said words being comprised of a binary-coded-decimal number part and a parity part, said parity part of said word including a parity bit, first delay means, means connecting said first delay means between said carry-output and said carry-input of said full-adder to delay by one cycle the carry-output bits to produce at said sum-output a first binary-coded-decimal sum, second delay means, means connecting said sum output to said second delay means, means connected to said second delay means for serially resubmitting said first binary-coded-decimal sum to one of said code inputs of said full-adder at a predetermined time after application to said second delay means of the last bit of said first binary-coded-decimal sum, correction-producing means, means providing connections from said sum-output to said correction-producing means, said correction-producing means producing a binary-coded-decimal number representing the decimal-six when said first binary-coded-decimal sum has a decimal equivalent greater than nine and producing a binary-coded-decimal number representing the decimal zero when said first binary-coded-decimal sum has a decimal equivalent of nine or less, means connecting the output of said correction-producing means to the other of said code inputs of said full-adder, said binary-coded-decimal produced by said correction-producing means being applied in time sequence with said resubmitted first binary-coded-decimal sum, a parity counter, said parity counter having three inputs and one output, gating means connecting each of said code-applying means to a separate one of two of said inputs of said parity counter, said gating means being energized only during the times said parity bit is applied, and means connecting the output of said first delay means to the third of said inputs of said parity counter, said parity counter including adding means to apply a bit in a "1" state to its said one output when an odd number of the bits applied to said three inputs are in a "1" state and to apply a bit in a "0" state to its said one output when none or an even number of the bits applied to said three inputs is in a "1" state.

19. The serial digital computer of claim 18 in which there is provided trigger means connected to said one output of said parity counter for determining if an odd or an even number of bits in a "1" state are produced by said parity counter during the time of application of each word to said full-adder.

20. The serial digital computer of claim 18 in which are provided generator means comprising a switching trigger and two counting triggers, and means interconnecting said switching trigger and said counting triggers for operation of a first of said counting triggers to count the number of bits in a "1" state produced by said parity counter and for operation of the second of said counting triggers to store the count previously made by that trigger, said switching trigger after the end of each word interchanging the operations of said counting triggers in respect to their said counting and said storing functions.

21. A serial digital computer for the addition of serially applied binary-coded-decimal numbers comprising a full-adder, said full-adder including two code inputs, a sum-output, a carry-input and carry-output, code means for serially applying a plurality of words to said code inputs, each word being comprised of two parts, a number part and a parity part, the number part of each word being representative of said binary-coded-decimal number, one of the binary digits of the parity part of each word being a parity bit, first delay means providing a one-bit delay, the input of said first delay means being connected to said carry-output and the output of said first delay means being connected to said carry-input whereby said full-adder produces a first binary-coded-decimal sum, second delay means providing a serial delay to each of the bits applied thereto of a time duration equal to the time duration of the number part of said words, means connecting said second delay means between said sum-output and one of said code inputs, said connecting means including a gating means to connect said sum-output to said second delay means only during the time of said number part of said words, correction means producing a correction comprising a binary-coded-decimal number representing the decimal six when said first binary-coded-decimal sum has a decimal equivalent greater than nine and producing a correction comprising a binary-coded-decimal number representing the decimal zero when said first binary-coded-decimal sum has a decimal equivalent less than ten, and means for connecting said correction means to the other of said code inputs and for operating it in time sequence with said second delay means.

22. A serial digital computer for the addition of serially applied binary-coded-decimal numbers comprising a full-adder, said full-adder including two code inputs, a sum-output, a carry-input and carry-output, code means for serially applying a plurality of words to said code inputs, each word being comprised of two parts, a number part and a parity part, the number part of each word being representative of said binary-coded-decimal number, one of the binary digits of the parity part of each word being a parity bit, first delay means providing a one-bit delay, the input of said first delay means being connected to said carry-output and the output of said first delay means being connected to said carry-input whereby said full-adder produces a first binary-coded-decimal sum, second delay means providing a serial delay to each of the bits applied thereto of a time duration equal to the time duration of the number part of said words, means connecting said second delay means between said sum-output and one of said code inputs, said connecting means including a gating means to connect said sum-output to said second delay means only during the time of said number part of said words, correction means producing a correction comprising a binary-coded-decimal number representing the decimal six when said first binary-coded-decimal sum has a decimal equivalent greater than nine and producing a correction comprising a binary-coded-decimal number representing the decimal zero when said first binary-coded-decimal sum has a decimal equivalent less than ten, means for connecting said correction means to the other of said code inputs and for operating it in time sequence with said second delay means, a parity counter, said parity counter being comprised of an adder having three inputs and a sum-output, and means connecting each of said code inputs of said full-adder to an individual one of two of said inputs of said parity counter, said last-named connecting means including gating means to pass only the parity bits of said words to said two inputs of said parity counter, said output of said first delay means being connected to said third input of said parity counter whereby said sum-output is in a "1" state when an odd number of the bits applied to said three inputs are in a "1" state and whereby said sum-output is in a "0" state when none or an even number of the bits applied to said three inputs are in a "1" state.

23. The serial digital computer of claim 22 in which there is provided generator means comprising a switching trigger and two counting triggers, and means interconnecting said switching trigger and said counting triggers to cause said switching trigger to connect successively an individual one of said counting triggers to said sum-output of said parity counter for the time duration of each successive word, each of said counting triggers counting the number of bits in a "1" state produced by said parity counter when that counting trigger is connected to said sum-output of said parity counter, each of said counting triggers storing the previously made count when that counting trigger is not connected to said parity counter.

24. In an electronic circuit for processing numbers including a full-adder having a first inverter in one of its two number input circuits, the improvement which comprises means for transforming the full-adder to a subtracter comprising a pair of AND-circuits, one of which has an input from one side of said first inverter and the other of which has an input from the other side of said first inverter, and a second inverter having its input connected to one of said last-named AND-circuits and its output connected to the other of said last-named AND-circuits, and switching means for controlling said second inverter for predetermining which of said last-named AND-circuits will be conditioned for conduction.

25. The electronic circuit of claim 24 in which there are provided means for producing an output representative of a borrow when required by the nature of the numbers applied to said number-input circuits, said last-named means including as part of its input means the outputs from said AND-circuits.

26. An electronic circuit for serially processing two successions of words, each of said words being comprised of a number part and a parity part, said number part of each of said words being representative of a binary-coded-decimal number, said electronic circuit producing a set of values also expressed in the binary-coded-decimal system including a binary arithmetic device having simultaneously applied thereto binary-coded-decimal numbers, said device having a carry-output, a carry-input and a sum-output, said device including first means for adding together said binary-coded-decimal numbers to produce an initial sum, first delay means connected between said carry-output and said carry-input of said device, said device including second means for adding together said initial sum and said carry-input to produce at said sum-output a first binary-coded-decimal sum, second delay means connected to said sum output of said binary arithmetic device, said second delay means providing a serial delay to said first binary-coded-decimal sum of a time duration equal to the time duration of the number part of said words, the output of said second delay means being applied to said binary arithmetic device for resubmitting said first binary-coded-decimal sum to said binary arithmetic device, additional means connected to said output of said binary arithmetic device for producing a binary output of predetermined decimal value when said first binary-coded-decimal sum has a decimal equivalent greater than nine, said last-named means producing a binary output having a decimal equivalent of zero when said first binary-coded-decimal sum has a decimal equivalent of nine or less, and means for applying said binary output of said additional means to said binary arithmetic device in time sequence with said resubmitted first binary-coded-decimal sum.

27. A serial digital computer comprising a first half adder and a second half adder, each of said first and second half adders having two inputs and each having a sum-output, the sum-output of said first half adder being connected to one of said two inputs of said second half adder, a carry-borrow input connected to the other of the inputs of said second half adder, said first half adder including in one of its input circuits a first inverter circuit, one of said inputs to said first half adder being connected to the input of said first inverter circuit, a first AND-circuit having two inputs, the input of said first inverter circuit being connected to one of said inputs of said first AND-circuit, a second AND-circuit having two inputs, the output of said first inverter circuit being connected to one of said inputs of said second AND-circuit, a second inverter circuit having input control means, said input of said second inverter circuit being connected to the other input of said second AND-circuit, the output of said second inverter circuit being connected to the other input of said first AND-circuit, a first OR-circuit, a gating means, the output of said first and of said second AND-circuits being connected through said first OR-circuit to said gating means, the other input to said first half adder and said carry-borrow input being connected to said gating means, said gating means producing a 1-output when at least two of said inputs applied thereto are in a "1" state, and means for applying pulses representative of number parts of words to said inputs of said first half adder for substraction or addition depending upon whether said input control means produces a 0-output or a 1-output from said second inverter.

28. A computer of the type to which there are supplied two streams of pulses as inputs representing in serial fashion a succession of bits, selected groups of which bits form words having number parts which present in serial fashion numerical input information expressed in a binary-coded-decimal system, comprising means including a full adder having a sum-output, a carry-input, a carry-output, and inputs to which said number parts in said two streams are simultaneously applied, said full adder including first means for adding together said number parts to produce an initial sum, one-cycle delay means having an input connected to said carry-output and an output connected to said carry-input of said full adder for applying each carry to said adder for a one-cycle delay, said full adder including second means for adding together said initial sum and said carry-input to produce at said sum output a first sum-output, multiple delay means connected to said full adder to receive and to store said first sum-outputs in number corresponding with the number of bits which in the number part of each word represents a decimal digit and to reproduce said first sums in succession at an output following the entry therein of the last bit of said decimal digit for resubmitting said sum-outputs to said full adder, a binary-to-decimal-correction system having input connections connected to said sum output and to said one-cycle delay means for applying to said full adder a binary input for producing from said first sum resubmitted by said multiple delay means a system output sum, each carry of which is a decimal carry, and means including an output circuit for transmitting serially by pulses and serially by words said system output sums.

29. An electronic circuit to which there are supplied a single stream of bits as inputs to be counted comprising a switching trigger and two counting triggers, means interconnecting said switching trigger and said counting triggers for selective operation of a first of said counting triggers in response to the number of bits in a "1" state contained in a selected number of bits in said stream of bits for indicating an "even" count or an "odd" count and for storing that count, and means responsive to the appearance of said number of bits for operating said switching trigger to interchange the operations of said counting triggers in respect to their said counting and said storing functions whereby said first counting trigger stores the odd or even count made thereby and after completion of the count by a second of said counting triggers, that trigger stores its odd or even count.

30. In an electronic circuit for processing numbers, a parity bit generator comprising counter means for serially producing a stream of bits to be counted, a switching trigger and two counting triggers, each trigger having two stable states, means interconnecting said switching trigger and said counting triggers for selective operation of a first of said counting triggers in response to the number of bits in a "1" state contained in a selected number of said bits produced by said counter means for indicating an "even" count or an "odd" count and for storing that count, means responsive to the production of a predetermined number of bits for producing an output signal, and means for applying said output signal to said switching trigger to switch said switching trigger from one stable state to the other stable state for interchanging the operations of said counting triggers in respect to their said counting and said storing functions whereby said first counting trigger stores the odd or even count made thereby and after completion of the count by a second of said counting triggers, that trigger stores its odd or even count.

31. An electronic computer for serially processing two successions of bits, selected groups of which bits form words having number parts, said number parts being expressed in the binary-coded-decimal system comprising means including a binary arithmetic device having a pair of input circuits to which there are simultaneously applied said number parts of said successions of bits, a half adder receiving from said input circuits said number parts for producing an output comprising the sum of said number parts, said device having a second half adder having as one of its two inputs the output from said first-named half adder, said device having a modifying output circuit, one-cycle delay means for applying the output from said modifying circuit to said remaining input of said second half adder, said device having means for producing on said modifying circuit an output representative of a carry, multiple delay means for resubmitting said first binary-coded-decimal sum to said binary arithmetic device, a correction system connected to said sum-output for producing a binary output of predetermined decimal value when said first binary-coded-decimal sum has a decimal equivalent greater than nine, said correction system producing a binary output having a decimal equivalent of zero when said first binary-coded-decimal sum has a decimal equivalent of nine or less, and means for applying said binary output of said correction system to said binary arithmetic device in time sequence with said resubmitted first binary-coded-decimal sum.

32. An electronic computer selectively operable for serially adding or subtracting the number parts of two successions of bits, said number parts being expressed in the binary-coded-decimal system comprising means including a binary arithmetic device having a pair of input circuits to which there are simultaneously applied said number parts of said successions of words, said device including a carry-borrow means having an output, one-cycle delay means for applying said output of said carry-borrow means to an additional input of said device, said device having means for producing at an output of said device a first arithmetic result comprising a first binary-coded-decimal sum during addition and a first binary-coded-decimal difference during subtraction, control means for applying said number parts and said additional input to said carry-borrow means for producing at said ouput thereof a signal respective of a carry when adding, said control means including means for inverting one of said number parts applied to said carry-borrow means for producing at said output thereof a signal respective of a borrow when subtracting, multiple delay means for resubmitting said first arithmetic result to one of said pair of input circuits of said binary arithmetic device, a correction system connected to said output of said device and to said output of said one-cycle delay means for producing a binary-coded-decimal number representing the decimal-six (1) when said first binary-coded-decimal sum has a decimal equivalent greater than nine during addition and (2) when a borrow is required from its next higher decimal digit by said first binary-coded-decimal difference during subtraction, and means for applying said binary output of said correction system to said binary arithmetic device in time sequence with said resubmitted first arithmetic result.

33. A serial digital computer comprising a first half adder and a second half adder, each of said first and second half adders having two inputs and each having a sum-output, the sum-output of said first half adder being connected to one of said two inputs of said second half adder, a carry-borrow input connected to the other of the inputs, of said second half adder, said first half adder including in one of its input circuits a first inverter circuit, one of said inputs to said first half adder being connected to the input of said first inverter circuit, a first AND-circuit having two inputs, the input of said first inverter circuit being connected to one of said inputs of said first AND-circuit, a second AND-circuit having two inputs, the output of said first inverter circuit being connected to one of said inputs of said second AND-circuit, a second inverter circuit having input control means, said input of said second inverter circuit being connected to the other input of said second AND-circuit, the output of said second inverter circuit being connected to the other input of said first AND-circuit, a first OR-circuit, a gating means, the output of said first and of said second AND-circuits being connected through said first OR-circuit to said gating means, the other input to said first half adder and said carry-borrow input being connected to said gating means, said gating means producing a 1-output when at least two of said inputs applied thereto are in a "1" state, means for applying pulses representative of number parts of words to said inputs of said first half adder for subtraction or addition depending upon whether said input control means produces a 0-output or a 1-output from said second inverter and said gating means including a third, a fourth and a fifth AND-circuit each having two inputs, said output of said first OR-circuit being connected to one each of the inputs of said third and said fourth AND-circuit, said carry-borrow input being connected to the other input of said fourth AND-circuit and to one of the inputs of said fifth AND-circuit, the other input of said first half adder being connected to the other input of said third AND-circuit and to the other input of said fifth AND-circuit, a second OR-circuit haivng three inputs, the outputs of said third, fourth and fifth AND-circuits being connected to a different one of said three inputs of said second OR-circuit.

References Cited in the file of this patent

UNITED STATES PATENTS

| | | |
|---|---|---|
| 2,848,532 | Weida | Aug. 19, 1958 |
| 2,848,607 | Maron | Aug. 19, 1958 |

FOREIGN PATENTS

| | | |
|---|---|---|
| 749,836 | Great Britain | June 6, 1956 |